(12) United States Patent
Ericsson

(10) Patent No.: US 6,871,889 B2
(45) Date of Patent: Mar. 29, 2005

(54) IMPACT ENERGY TRANSMITTING ARRANGEMENT

(75) Inventor: Mattias Ericsson, Varberg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/626,782

(22) Filed: Jul. 24, 2003

(65) Prior Publication Data

US 2004/0222667 A1 Nov. 11, 2004

(30) Foreign Application Priority Data

Jul. 24, 2002 (EP) ............................................. 02078005

(51) Int. Cl.⁷ .............................................. B60R 19/26
(52) U.S. Cl. ........................ 293/132; 293/133; 293/120
(58) Field of Search ................................. 293/132, 133, 293/120, 135, 134, 102; 296/187.12, 187.04; 280/784; 188/371, 372

(56) References Cited

U.S. PATENT DOCUMENTS

| | | | | |
|---|---|---|---|---|
| 5,293,973 A | * | 3/1994 | Thum ......................... | 293/133 |
| 5,351,791 A | * | 10/1994 | Rosenzweig ................ | 188/372 |
| 5,732,801 A | * | 3/1998 | Gertz ......................... | 293/132 |
| 6,050,624 A | * | 4/2000 | Kim ........................... | 293/132 |
| 6,106,039 A | * | 8/2000 | Maki .......................... | 293/132 |
| 6,135,251 A | * | 10/2000 | Hartlieb et al. ............. | 188/371 |
| 6,179,355 B1 | * | 1/2001 | Chou et al. ................. | 293/132 |
| 6,293,587 B1 | * | 9/2001 | Lapic et al. ................. | 293/133 |
| 6,554,333 B2 | * | 4/2003 | Shimotsu et al. ........... | 293/132 |
| 6,601,886 B1 | * | 8/2003 | Thayer ....................... | 293/133 |
| 6,663,151 B2 | * | 12/2003 | Mansoor et al. ............ | 293/120 |
| 6,702,345 B1 | * | 3/2004 | Yoshida ...................... | 293/133 |
| 6,820,924 B2 | * | 11/2004 | Caliskan et al. ............ | 293/133 |

* cited by examiner

*Primary Examiner*—Kiran Patel
(74) *Attorney, Agent, or Firm*—Gigette M. Bejin

(57) ABSTRACT

An impact energy transmitting arrangement (10) for transmitting energy, which arises during impact between a vehicle (12) on which the arrangement (10) is mounted and a foreign body, to a vehicle structure (14). The arrangement includes first means (18) displaceable in a first direction, and second means (20) adapted for co-operation with the first means. The first and second means are operable such that the arrangement, below a first predetermined value of a parameter representative of the energy to be transmitted, presents a first resistance-to-displacement value and, above the first predetermined value, presents a second resistance-to-displacement value. The first resistance-to-displacement value is greater than the second resistance-to-displacement value. In this manner, a bumper assembly which is stiff at very low speeds is rendered less stiff at higher speeds which otherwise could cause injury to pedestrians.

29 Claims, 9 Drawing Sheets

IMPACT ENERGY TRANSMITTING ARRANGEMENT

TECHNICAL FIELD

The present invention relates to an impact energy transmitting arrangement for transmitting energy, which arises during impact between a vehicle on which said arrangement is mounted and a foreign body, to the vehicle structure. The invention further relates to a method of transmitting energy, which arises during impact between a vehicle on which said arrangement is mounted and a foreign body, to the vehicle structure.

BACKGROUND OF THE INVENTION

Motor vehicle manufacturers are constantly striving to provide vehicles which, in the event of a collision, reduce the risk of injury to persons involved in the collision. These persons may be occupants of the vehicle or a pedestrian which is struck by the vehicle. To this end, vehicles are nowadays designed with so-called deformation zones which deform in a controlled manner to thereby absorb energy which arises during impact between the vehicle and an object. The amount of energy which arises in a collision is proportional to the square of the relative velocity between the vehicle and the object at impact. Obviously, the risk of injury to occupants of vehicles is increased at higher speeds. Due to the considerable amounts of energy which arise as a result of high speed collisions, the deformation zones must exhibit a certain degree of stiffness, or resistance to deformation, to function effectively at those high speeds.

Most collisions between vehicles and pedestrians occur in built-up areas in which the speed of the vehicles is relatively low. For example, most jurisdictions impose a speed limit in built-up areas of about 50 km/h. Due to the relatively light weight of most pedestrians, the amount of energy which arises in a low speed collision between a vehicle and a pedestrian is relatively low. This implies that the deformation zones of the vehicle are not caused to deform to any great extent and therefore a large amount of the energy is transmitted to the pedestrian, possibly resulting in injury.

In an attempt to reduce pedestrian injury, the prior art has suggested various ways of reducing the stiffness of a vehicle during collision with a pedestrian. For example, in U.S. Pat. No. 6,050,624 a bumper mounting structure is disclosed having a dual rate shock absorbing member which offers less resistance to deformation at low impact energy amounts and higher resistance to deformation at higher impact energy amounts. In the bumper arrangement according to DE-A-199 42 167, longitudinal displacement of a sliding member is restricted by a pin at higher speeds or if a sensor detects the proximity of an object larger than a pedestrian. At lower speeds, the pin is disengaged from the sliding member, thereby facilitating displacement of the sliding member to progressively absorb the impact energy. EP-A-0 983 909 describes a stiffener assembly for a bumper system of a motor vehicle, which assembly includes a stiffener operatively connected to the bumper system and movable between an up position and a down position based on the speed of the vehicle.

A disadvantage with components which are readily deformable at low impact speeds is that such components may need to be replaced as a result of a low speed collision in which the risk of personal injury is negligible. Such may be the case, for example, in a collision at parking speeds between a vehicle and, say, a lamppost. Furthermore, in order to keep production costs low, any impact absorbing or transmitting arrangement should be as simple as possible.

SUMMARY OF THE INVENTION

It is therefore an object of the present invention to provide an impact energy transmitting arrangement which is simple in operation and which survives low speed impacts intact, but which nevertheless offers reduced risk of injury to pedestrians.

This object is achieved in accordance with the present invention by the impact energy transmitting arrangement as claimed in claim 1.

It is a further object of the present invention to provide a method of reducing risk of pedestrian injury in a collision between a vehicle and a pedestrian.

This object is achieved in accordance with the present invention by the method as claimed in claim 29.

The invention is based on the insight that a collision between a pedestrian and a vehicle at very low speeds is survivable for the pedestrian even if the vehicle were to be essentially rigid. This is because the amount of energy which arises during impact is relatively low. However, as speed increases, and as previously been mentioned, the amount of energy increases as a square of the speed. This necessitates the provision of a readily displaceable member which can be used to ensure that the energy is absorbed in such a manner that as little energy as possible is transmitted to the pedestrian.

Thus, in the present invention an impact energy transmitting arrangement is provided with first means displaceable in a first direction, and second means adapted for co-operation with the first means. The first and second means are operable such that, as a result of an impact between the vehicle and a foreign body for which the energy to be transmitted is below a first predetermined value, the arrangement is stiffer than it would be as a result of an impact for which the energy to be transmitted is above the first predetermined value.

In order that vehicle deformation zones shall function adequately during high speed collisions, an arrangement which is stiffer than that for optimal pedestrian injury reduction is required. In accordance with an preferred embodiment, the first and second means are operable such that, as a result of an impact between the vehicle and a foreign body for which the energy to be transmitted is above a second predetermined value, the arrangement is stiffer than it would be as a result of an impact at a velocity below the second predetermined value. The first and second predetermined values may correspond to velocities of about 15 km/h and 60 km/h, respectively, for typical collisions between a vehicle and a pedestrian.

Preferred embodiments of the arrangement according to the present invention are detailed in the dependent claims.

BRIEF DESCRIPTION OF THE DRAWINGS

The invention will be described in the following by way of example only and with reference to the embodiments illustrated in the drawings, in which.

DETAILED DESCRIPTION OF PREFERRED EMBODIMENTS

Figure 4A:
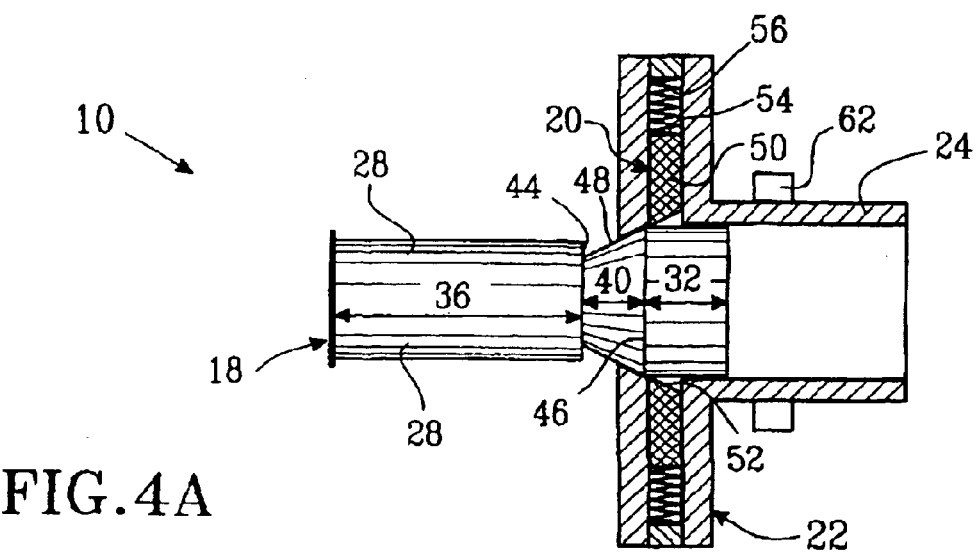
FIG. 4A is a schematic sectional elevation view corresponding to FIG. 2 with the arrangement in its non-influenced condition.
Figure 4B:
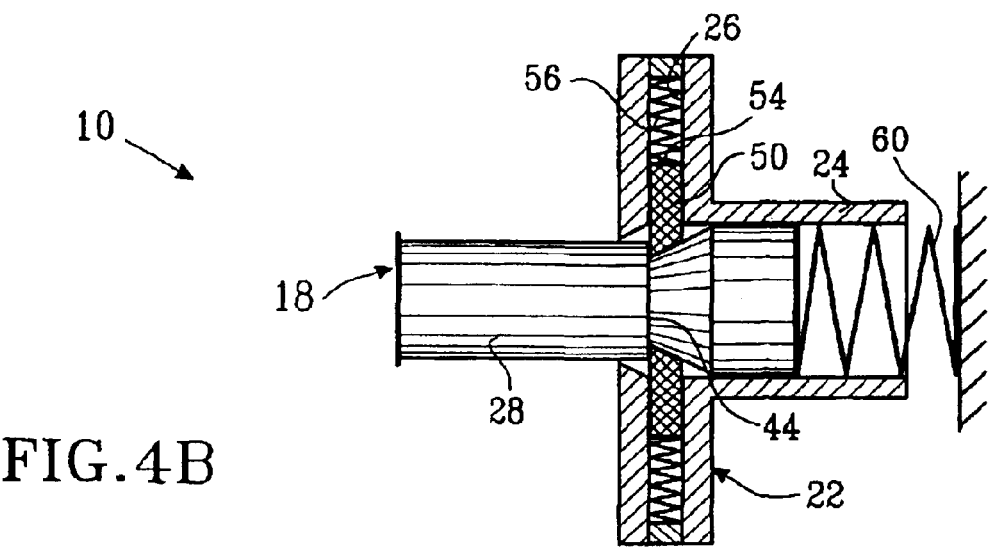
FIG. 4B is a schematic sectional view corresponding to FIG. 4A, though with the arrangement in a condition after a typical low speed impact.
Figure 4C:
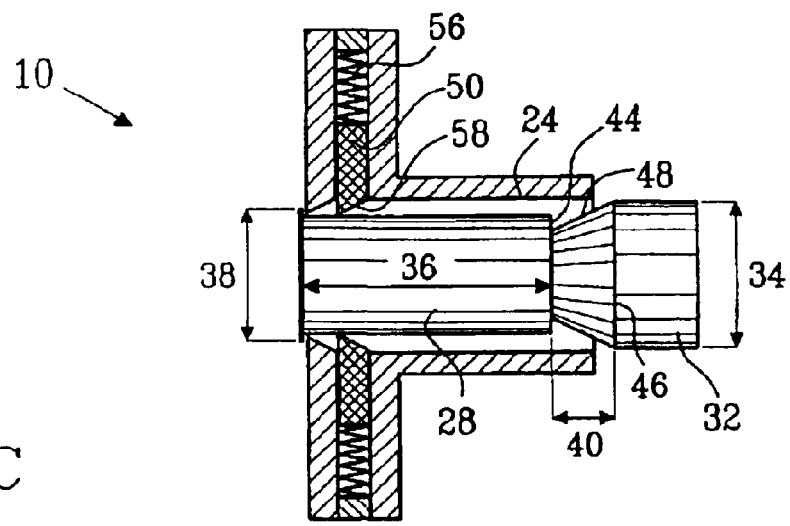
FIG. 4C is a schematic sectional view corresponding to FIG. 4A, though with the arrangement in a condition after a typical impact with a pedestrian.
Figure 5:
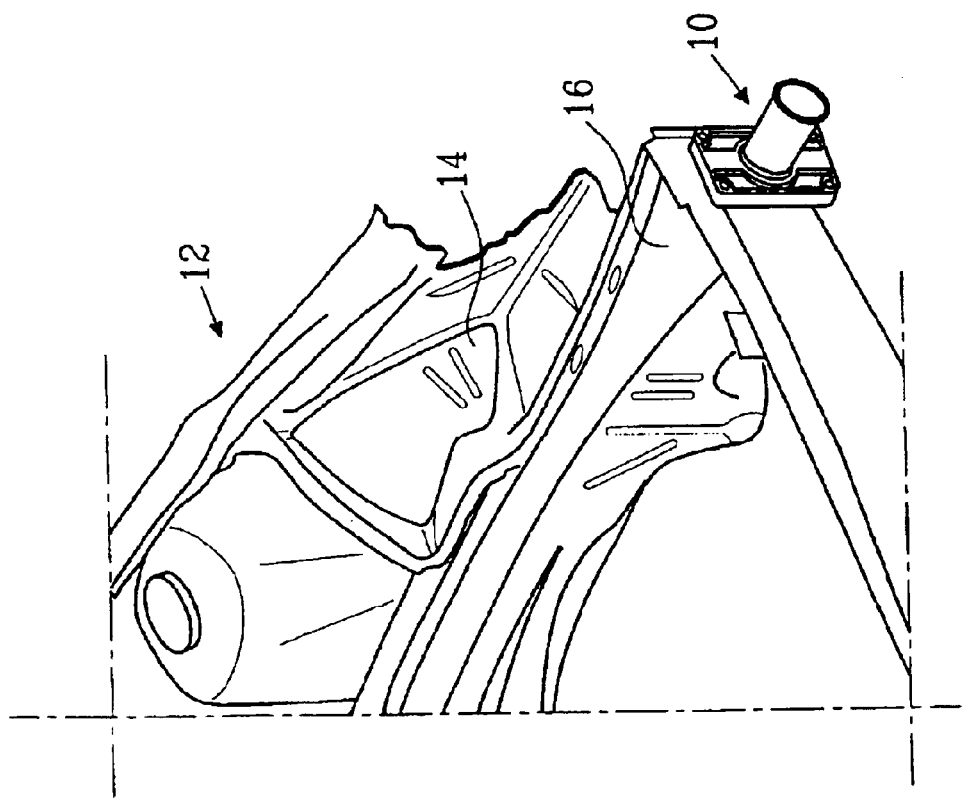
FIG. 5 is a schematic perspective view of the arrangement of the first embodiment according to the present invention mounted on a vehicle.

In the drawings constituted by FIGS. 1 to 6, reference numeral 10 generally denotes an impact energy transmitting arrangement in accordance with a first embodiment of the present invention. As illustrated in FIG. 5, the arrangement 10 is intended to be mounted on a vehicle, generally denoted by 12, so as to transmit energy which arises during an impact between the vehicle and a foreign body to the vehicle structure 14. In this respect, the vehicle structure 14 is generally a part of a deformation zone at the front of the vehicle and may comprise a longitudinally extending progressively deformable beam 16 adapted to absorb energy during an impact.

In the following description, the expression "foreign body" encompasses any object remote from the vehicle with which the vehicle may impact. Thus, the foreign body may be constituted by another vehicle, a pedestrian, a building, a lamppost or signpost, an animal, a tree or any other movable or immovable object.

Figure 1:
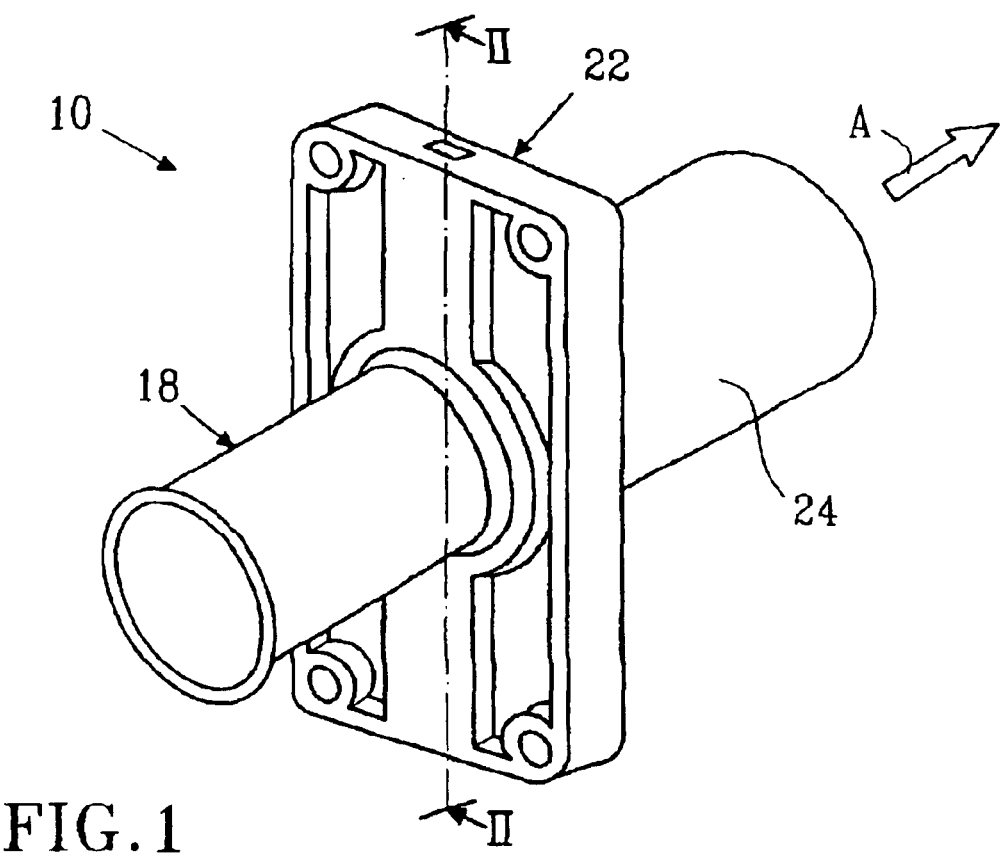
FIG. 1 is a schematic perspective view of a first embodiment of an impact energy transmitting arrangement according to the present invention.
Figure 2:
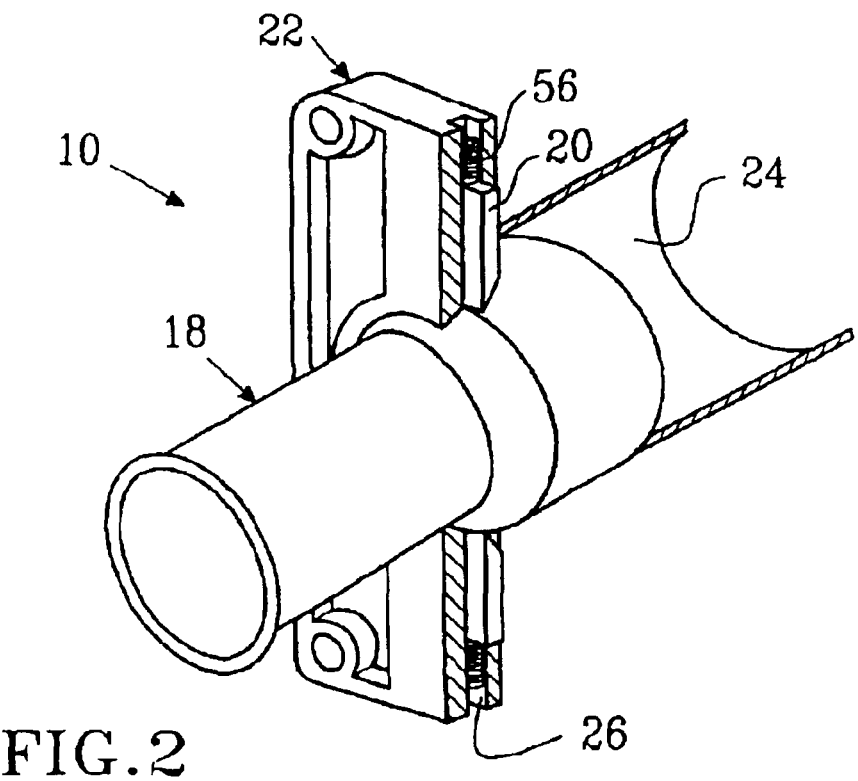
FIG. 2 is a sectional view along line II—II of FIG. 1.

With particular reference to FIGS. 1 and 2, the impact energy transmitting arrangement 10 of a first embodiment of the present invention comprises a first means 18 which is displaceable in a first direction denoted by arrow A in FIG. 1, and second means 20 adapted for co-operation with the first means. The first and second means are arranged in a housing 22 which thereby defines a self-contained unit which may be mounted on a vehicle in the manner illustrated in FIG. 5. In a preferred embodiment, the second means is arranged for displacement in a second direction substantially perpendicular to the first direction. To facilitate displacement of the first and second means, the housing 22 may be provided with a first guide portion 24 extending in the first direction and a second guide portion 26 extending in the second direction.

Figure 3:
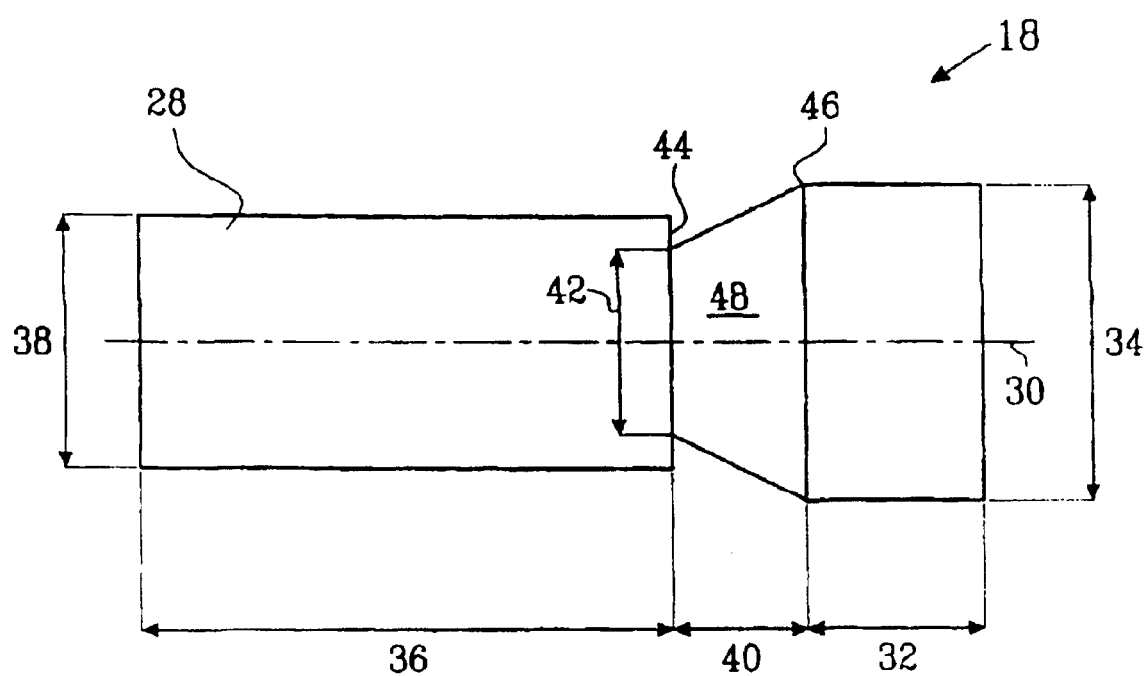
FIG. 3 is a schematic elevation view of a component of the arrangement of the first embodiment according to the present invention.

The first means 18 is shown in greater detail in FIG. 3. Thus, the first means 18 is constituted by an elongate member 28 having a longitudinal extension along a longitudinal axis 30 in the first direction, i.e. the direction of its intended displacement. The elongate member 28 may have any suitable cross-sectional shape, though it is preferably circular. In order to function optimally, the inertia of the elongate member should be as low as possible. Hence, it is advantageous if the elongate member is in the form of a tube made from lightweight material. Irrespective of its actual shape, the elongate member presents a transverse extension in the second direction. Along its longitudinal axis 30, the elongate member has a first region 32 having a first transverse dimension 34 in the second direction and a second region 36 having a second transverse dimension 38 in the second direction. The second transverse dimension is less than said first transverse dimension. A third region 40 is provided between the first and second regions. The third region has a minimum third transverse dimension 42 in the second direction which is less than the second transverse dimension 38. The third region 40 abuts the second region 36 at a location at which the third region has its minimum third transverse dimension 42 such that an abutment shoulder 44 is formed. The third region 40 also abuts the first region at a location 46 at which the third region has a maximum third transverse dimension having a value substantially equal to the first transverse dimension 34 of the first region 32. Advantageously, the third region 40 has a surface 48 which tapers from the maximum to the minimum third transverse dimension along a first distance in the first direction. The first region 32 extends a distance along the longitudinal axis 30 sufficient to allow the first guide portion 24 of the housing (see FIG. 2) to guide the elongate member 28 during at least its initial displacement in the first direction.

The second means 20 will now be described with particular reference to FIGS. 4A to 4C.

The second means 20 comprises at least one abutment member 50 having a first end 52 and a second end 54. In the illustrated preferred embodiment, two opposed abutment members are provided. For the sake of clarity, reference will be made in the following to just one of the abutment members, though it is to be understood that the abutment members are identical. The abutment member 50 is disposed in the second guide portion 26 of the housing 22 such that its first end 52 is proximal the elongate member 28. The second end 54 of the abutment member is influenced by resilient means such as a helical spring 56 to bias the abutment member towards the elongate member 28. In a manner which will be described in greater detail in the following, the helical spring 56 urges the second means in the form of the abutment member 50 at a predetermined rate of acceleration towards the first means 18.

In a non-influenced condition, i.e. before impact, of the arrangement 10, and as illustrated in FIG. 4A, the first end 52 of the abutment member 50 abuts against the first region 32 of the elongate member at a location substantially corresponding to the location 46 at the intersection between the first and third regions of the elongate member. Preferably, the first end 52 of the abutment member is chamfered such that it presents an angle substantially corresponding to the angle of taper of the surface 48 of the third region 40 of the elongate member 28. Accordingly, the first end presents a surface 58 which is substantially parallel to the surface 48 of the third region.

The first embodiment of the impact energy transmitting arrangement of the present invention is designed to be operable in the following manner.

The arrangement 10 is illustrated in FIG. 4A in its non-influenced condition, i.e. before impact between the vehicle upon which it is mounted and a foreign body. The first region 32 of the elongate member projects into the first guide portion 24 of the housing 22. As previously mentioned, the first end 52 of the abutment member 50 abuts against the first region 32 of the elongate member at a location substantially corresponding to the location 46 at the intersection between the first and third regions of the elongate member.

If the vehicle to which the arrangement 10 is mounted is involved in a low speed collision with a foreign body, for example the velocity of the vehicle is below 30 km/h, preferably below 20 km/h and is most preferably about 15 km/h, the arrangement will be caused to adopt the condition illustrated in FIG. 4B. Thus, upon impact, the elongate member 28 is caused to accelerate along the first guide portion 24 past the first end 52 of the abutment member 50. Due to the relatively low quantity of energy which arises during such a low speed impact, the rate of acceleration of the elongate member will be such that the helical spring 56 maintains the first end 52 of the abutment member 50 in contact with the elongate member. Accordingly, the surface 58 of the first end of the abutment member slides over the tapered surface 48 of the third region 40 of the elongate member until the abutment member is caused to abut against the abutment shoulder 44 on the elongate member. In this condition, further displacement of the elongate member 28 in the first direction is prevented and the arrangement presents a first resistance-to-displacement value.

If the vehicle to which the arrangement 10 is mounted is involved in a somewhat higher speed collision with a foreign body, such as a pedestrian, for example the velocity of the vehicle is up to about 60 km/h, the arrangement will be caused to adopt the condition illustrated in FIG. 4C. Again, upon impact, the elongate member 28 is caused to accelerate along the first guide portion 24 past the first end 52 of the abutment member 50. Due to the higher speed of impact compared with the FIG. 4B scenario, the rate of acceleration of the elongate member will also be higher. By appropriate selection of i.a. the biasing force applied to the abutment member 50 by the helical spring 56, the abutment member 50 will be caused to accelerate at a predetermined rate towards the elongate member 28 such that before the first end of the abutment member has travelled a distance corresponding to the difference between the first transverse dimension 34 of the elongate member and the second transverse dimension 38, the elongate member has travelled along the first guide portion 24 of the housing 22 a distance greater than the extension of the third region 40 of the elongate member. This implies that the abutment shoulder 44 will travel past the first end 52 of the abutment member without the abutment member having made contact with the third region of the elongate member. As such, the abutment member will be caused to abut against the second region 36 of the elongate member and continued displacement of the elongate member through the first guide portion of the housing will not be hindered by the abutment member. In this condition, the arrangement presents a second resistance-to-displacement value which is considerably lower than the first resistance-to-displacement value attained in the FIG. 4B condition.

In a non-limiting embodiment of the invention the distance corresponding to the difference between the first transverse dimension 34 of the elongate member and the second transverse dimension 38 may be about 5 mm and the extension of the third region 40 of the elongate member along the longitudinal axis 30 may be about 20 mm.

In a preferred embodiment of the invention, and as is schematically illustrated in FIG. 4B, the arrangement 10 may be provided with return means 60 acting on the elongate member 28 to return the arrangement to its non-influenced condition corresponding to FIG. 4A. The return means 60 may be constituted by a spring or may comprise hydraulic or pneumatic means.

In order that vehicle deformation zones shall function adequately during high speed collisions, an arrangement which is stiffer than that for optimal pedestrian injury reduction is required. Thus, in accordance with an preferred embodiment, the first means and second means are operable such that, as a result of an impact between the vehicle and a foreign body for which the energy to be transmitted is above a second predetermined value, the arrangement is stiffer than it would be as a result of an impact for which the energy to be transmitted is below the second predetermined value. The second predetermined value may correspond to a velocity above 40 km/h, preferably above 50 km/h and is most preferably about 60 km/h. This may be attained by providing the arrangement 10 with actuable retarding means 62 for retarding the displacement of the elongate member 28 through the first guide portion 24 of the housing. In FIG. 4A the actuable retarding means 62 is schematically illustrated as a constricting ring located around the first guide portion slightly downstream of the first region of the elongate member 28 when the arrangement 10 is in its non-influenced condition. Upon impact with a foreign body at a velocity above a predetermined value, the actuable retarding means 60 is actuated, for example by a speed-dependent sensor, to constrict the first guide portion 24, thereby retarding the elongate member 28. Thus, the elongate member is caused to accelerate past the first end 52 of the abutment member 50 at a rate such that the abutment member is caused to abut against the abutment shoulder 44 in a manner similar to that explained above with respect to FIG. 4B.

A second embodiment of the present invention will now be described with particular reference to FIGS. 7A to 7D and FIG. 8. In these drawings, reference numeral 70 generally denotes the impact energy transmitting arrangement of the second embodiment of the present invention. The first means is denoted by 72 and the second means by 74. In common with the first embodiment, the first and second means are arranged in a housing 76 which thereby defines a self-contained unit which may be mounted on a vehicle in a similar manner to that illustrated in FIG. 5. In contrast to the first embodiment in which the first and second means are not joined, in the second embodiment the second means 74 is carried by the first means 72 in a manner which is described below.

Thus, the first means 72 is constituted by an elongate member 78 having a longitudinal extension along a longitudinal axis 80 in the first direction, i.e. the direction of its intended displacement. The elongate member 78 may have any suitable cross-sectional shape, though it is preferably circular. In order to function optimally, the inertia of the elongate member should be as low as possible. Hence, it is advantageous if the elongate member is in the form of a tube made from lightweight material such as aluminium or plastic. The elongate member 78 comprises two distinct portions, namely a first portion 82 arranged to be located substantially within the housing 76 when the arrangement 70 is in its non-influenced condition, and a second portion 84 projecting out of the housing in the non-influenced condition of the arrangement. The second portion 84 has a distal end 86 which is intended to receive the initial impact in the event of a collision, and a proximal end 88 adjacent the first portion 82. In the drawings, the first and second portions have been illustrated as two separate components joined together to form the elongate member 78. However, it is to be understood that it is within the scope of the present invention that the elongate member 78 be made in one piece.

The first portion 82 has a proximal end 90 having a first transverse dimension 92, i.e. an extension in the direction perpendicular to the longitudinal axis 80. The proximal end 90 lies adjacent the proximal end 88 of the second portion 84. To permit the elongate member 78 to be displaceable within the housing 76, the first transverse dimension 92 must be at least as great as the transverse dimension of the second portion 84 over the portion of the second portion which has to be able to pass through the housing. The first portion 82 has a distal end 94 which advantageously has a second transverse dimension 96 which is greater than the first transverse dimension 92. Between its proximal end 90 and its distal end 94, the first portion 82 of the elongate member has an intermediate portion 98 having a transverse dimension which is less than the first transverse dimension 92. The intermediate portion 98 is arranged to carry the second means 74.

Thus, the second means 74 is constituted by at least one pivotal abutment member 100. The abutment member 100 has an extension in the direction of the longitudinal axis 80 and is pivotally mounted to the intermediate portion 98 of the first portion 82 of the elongate member 78 about a pivot axis 102 approximately mid way along the abutment member. Preferably, the pivot axis 102 extends perpendicular to the longitudinal axis 80. The abutment member 100 has a first abutment end 104 and a second abutment end 106. In a manner which will be explained in greater detail below, the first and second abutment ends are adapted to co-operate with recesses in the housing 76.

Figure 8:
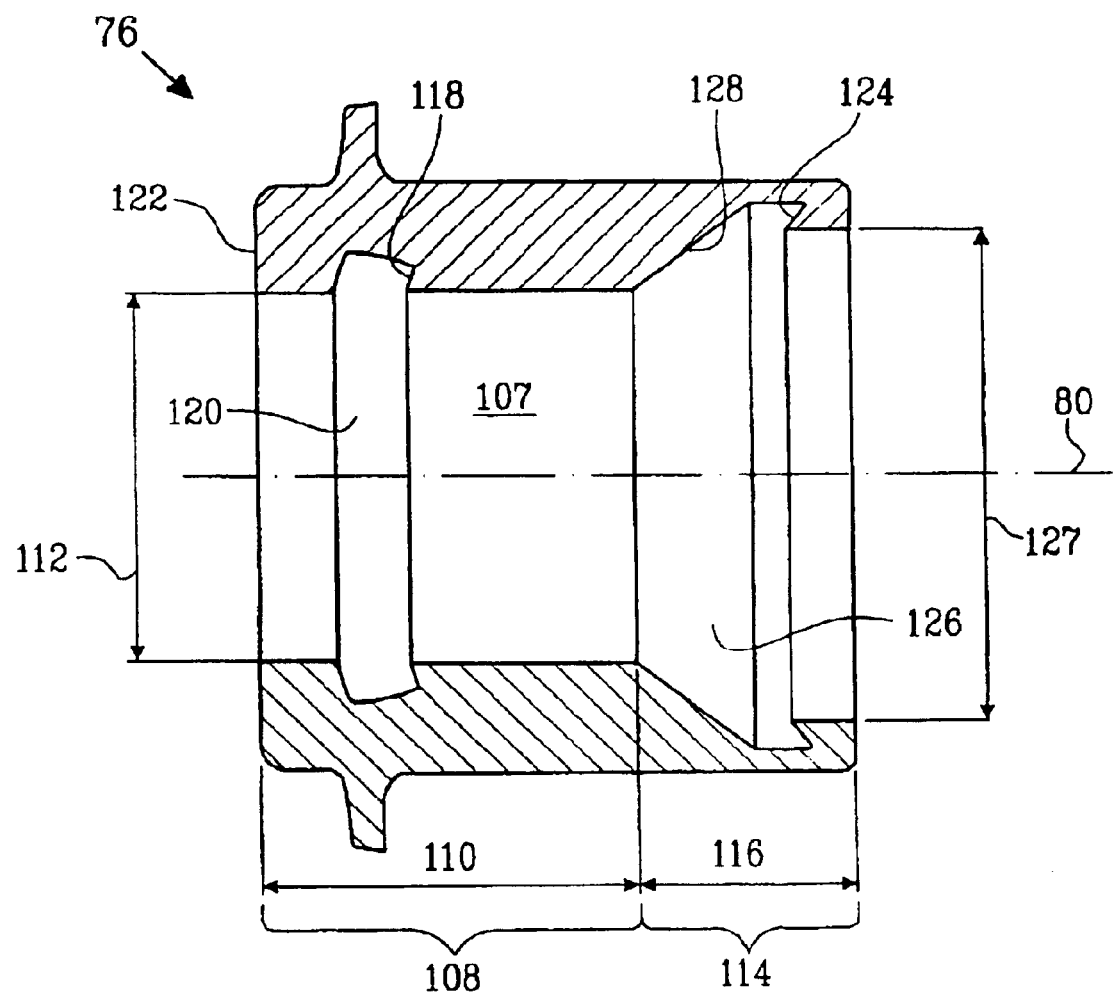
FIG. 8 is a schematic sectional view through the housing of the second embodiment of the impact energy transmitting arrangement.

The housing 76 is shown most clearly in FIG. 8 and has an inner mantle surface 107 delimiting a through hole. Along the longitudinal axis 80, the though hole has a first region 108 having a first longitudinal dimension 110 and a first transverse dimension 112. The through hole further has a second region 114 having a plurality of second longitudinal dimensions 116. In the second region 114, the second transverse dimensions of the through hole vary, but are always greater than the first transverse dimension 112.

The first region 108 is provided with a first abutment surface 118. In the illustrated embodiment, the first abutment surface 118 is formed by a portion of a first recess 120 in the inner mantle surface 107 of the housing. It is to be understood, however, that the first abutment surface may instead be constituted by the end face 122 of the housing 76. The second region 114 of the through hole has a second abutment surface 124 formed by a portion of a second recess 126 in the inner mantle surface 107 of the housing. The second recess has a tapering surface 128 terminating at a point at which the second transverse dimension of the through hole is a maximum. The second abutment surface 124 is then formed by a region of lesser transverse dimension 127 than the maximum second transverse dimension. Advantageously, the first and second abutment surfaces 118, 124 form an acute angle with respect to the longitudinal axis 80 such that undercuts are formed in the housing.

Referring back to FIG. 7A, it will be noted that the pivotal abutment member 100 is influenced by a biasing member which, and as illustrated, may be constituted by a spring 130. The spring 130 is arranged with respect to the elongate member 78 and the abutment member such that the second abutment end 106 of the abutment member is continuously biased towards the inner mantle surface 107 of the housing. In the non-influenced condition of the arrangement 70, the second abutment end 106 abuts the inner mantle surface 107 substantially at the intersection between the first region 108 and the second region 114 of the through hole of the housing, i.e. at the commencement of the tapering surface 128. When two pivotal abutment members 100 are utilised, the spring 130 may advantageously be arranged to act on both members simultaneously by locating the spring 130 in a through hole 132 in the intermediate portion 98 of the first portion 82 of the elongate member 78.

The second embodiment of the impact energy transmitting arrangement of the present invention is designed to be operable in the following manner.

Figure 7A:
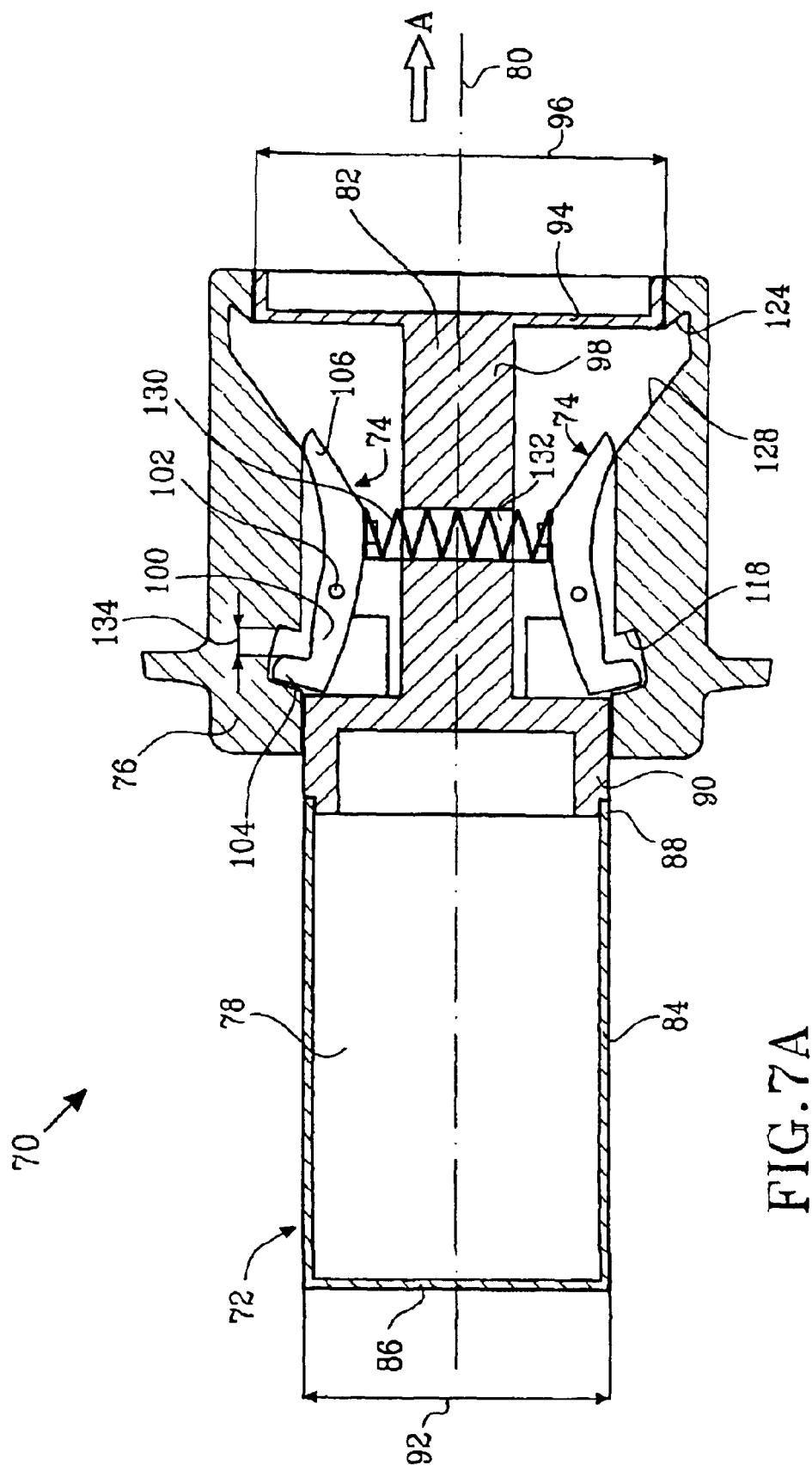
FIG. 7A is a schematic sectional view of a second embodiment of an impact energy transmitting arrangement according to the present invention with the arrangement in its non-influenced condition.

The arrangement 70 is illustrated in FIG. 7A in its non-influenced condition, i.e. before impact between the vehicle upon which it is mounted and a foreign body. It is to be noted that there is a distance 134 defining a gap between the first abutment end 104 of the abutment member 100 and the first abutment surface 118 of the first recess 120 in the housing 76.

Figure 7B:
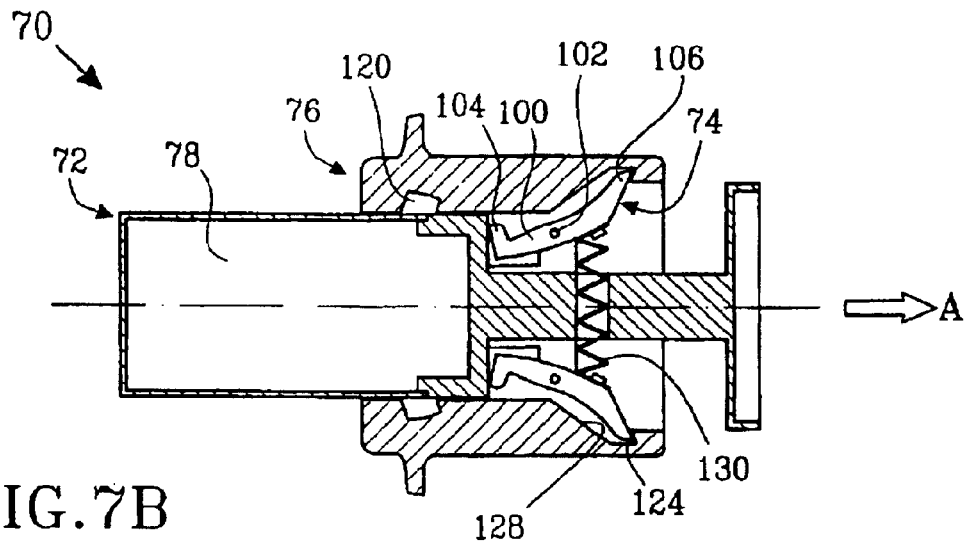
FIG. 7B is a schematic sectional view corresponding to FIG. 7A, though with the arrangement in a condition after a typical low speed impact.

If the vehicle to which the arrangement 10 is mounted is involved in a collision in which the energy which arises is relatively low, for example for a typical the low speed collision of the vehicle with a pedestrian with the velocity of the vehicle being below 30 km/h, preferably below 20 km/h and being most preferably about 15 km/h, the arrangement will be caused to adopt the condition illustrated in FIG. 7B. Thus, upon impact, the elongate member 78 is caused to accelerate in the direction of arrow A through the housing 76. Due to the relatively low quantity of energy which arises during such a low speed impact, the rate of acceleration of the elongate member will be such that the spring 130 maintains the second abutment end 106 of the abutment member 100 in contact with the inner mantle surface 107 formed by the second recess 126. Accordingly, the second abutment end 106 of the abutment member slides over the tapering surface 128 of the housing. Since the spring 130 effects pivotal displacement of the abutment member about the pivot axis 102 during displacement of the elongate member 78, the first abutment end 104 of the abutment member will be withdrawn from the first recess 120. This implies that the elongate member may continue its displacement until the second abutment end 106 of the abutment member abuts against the second abutment surface 124 in the second region 114 of the through hole of the housing. In this condition, further displacement of the elongate member 78 in the first direction is prevented and the arrangement presents a first resistance-to-displacement value.

Figure 7C:
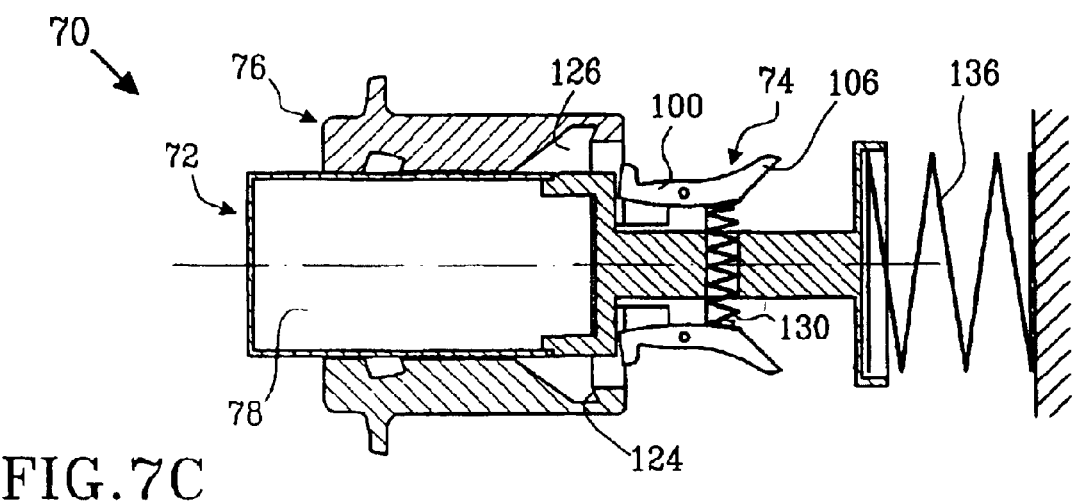
FIG. 7C is a schematic sectional view corresponding to FIG. 7A, though with the arrangement in a condition after a typical impact with a pedestrian.

If the vehicle to which the arrangement 70 is mounted is involved in a somewhat higher speed collision with a foreign body, such as a pedestrian, for example the velocity of the vehicle is up to about 60 km/h, the arrangement will be caused to adopt the condition illustrated in FIG. 7C. Again, upon impact, the elongate member 78 is caused to accelerate in the direction of arrow A through the housing 76. Due to the higher amount of energy which arises in such an impact compared with the FIG. 7B scenario, the rate of acceleration of the elongate member will also be higher. By appropriate selection of i.a. the biasing force applied to the abutment member 100 by the spring 130, the second abutment end 106 of the abutment member will be caused to accelerate at a predetermined rate towards the inner mantle surface of the second recess 126 such that, before the first end of the abutment member has travelled a distance in the transverse direction corresponding to half the difference between the lesser transverse dimension 127 and the first transverse dimension 112 of the housing, the elongate member has travelled a distance greater than the longitudinal extension of the second recess 126. This implies that the second abutment end 106 of the abutment member 100 will travel past the second abutment surface 124 of the second recess 126 of the housing without the second abutment end 106 having made contact with the inner mantle surface of the second recess. As such, continued displacement of the elongate member 78 through the housing 76 will not be hindered by the abutment member. In this condition, the arrangement presents a second resistance-to-displacement value which is considerably lower than the first resistance-to-displacement value attained in the FIG. 7B condition.

As with the first embodiment, the arrangement 70 may be provided with return means 136 acting on the elongate member 78 to return the arrangement to its non-influenced condition corresponding to FIG. 7A. The return means 136 may be constituted by a spring or may comprise hydraulic or pneumatic means.

Figure 7D:
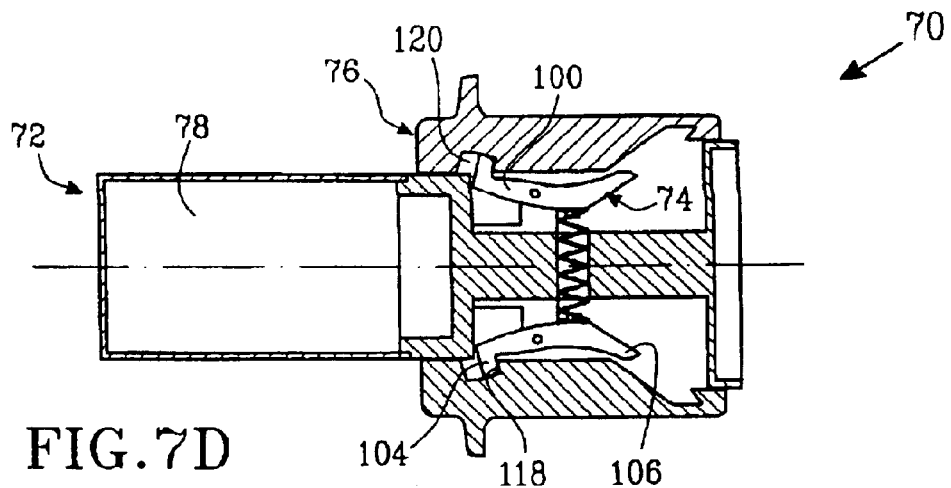
FIG. 7D is a schematic sectional view corresponding to FIG. 7A, though with the arrangement in a condition after a typical high speed impact.

In accordance with a preferred embodiment, the first means 72 and second means 74 are operable such that, as a result of an impact between the vehicle and a foreign body for which the energy to be transmitted is above a second predetermined value, the arrangement is stiffer than it would be as a result of an impact for which the energy to be transmitted is below the second predetermined value. The second predetermined value may correspond to a velocity above 40 km/h, preferably above 50 km/h and is most preferably about 60 km/h. This is attained by suitable selection of the distance 134 defining the gap between the first abutment end 104 of the abutment member 100 and the first abutment surface 118 of the first recess 120 in the housing 76 when the arrangement 70 is in its non-influenced condition. Due to the high amount of energy which arises in e.g. a high speed collision, the elongate member 78 will be accelerated at a high rate. This implies that, and as is illustrated in FIG. 7D, the elongate member 78 will cover the above-defined distance 134 before the second abutment end 106 of the abutment member has had time to be displaced in the radial displacement a distance corresponding to the distance of projection of the first abutment end 104 of the abutment member into the first recess 120. This implies that the first abutment end 104 will be brought into abutment with the first abutment surface 118 of the first recess 120. In this condition, further displacement of the elongate member 78 in the first direction is prevented and the arrangement presents a third resistance-to-displacement value which is considerably greater than the second resistance-to-displacement value.

In the first and second embodiments described above, the first means 18, 72 undergo a substantially rectilinear displacement in the first direction. A third embodiment will now be described in which the first direction is a direction of rotation, i.e. the displacement is a rotational displacement.

Figure 9:
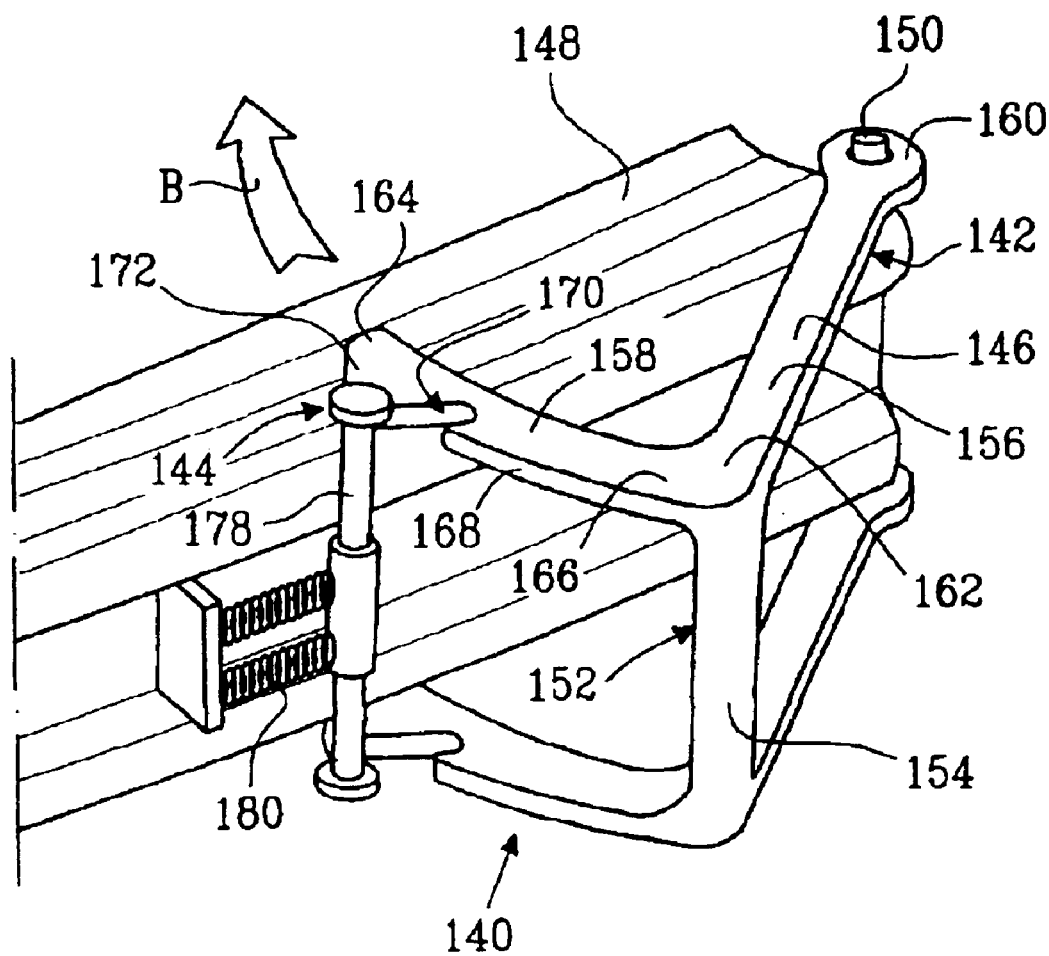
FIG. 9 is a schematic perspective view of a third embodiment of an impact energy transmitting arrangement according to the present invention.

Thus, with reference to FIG. 9 and FIGS. 10A to 10C, reference numeral 140 generally denotes the impact energy transmitting arrangement of the third embodiment of the invention. The first means is denoted by 142, and the second means by 144. The first means is constituted by a pivotal member 146 arranged to be pivotally mounted to a structural component 148 of a vehicle at a pivot point 150. When the pivotal member 146 is arranged at the front of a vehicle, the pivotal member 146 presents a forward impact region 152 which, in the non-influenced condition of the arrangement as shown in FIG. 9, projects beyond the pivot point 150 seen in the direction of forward travel of the vehicle. In other words, if the vehicle were to be involved in a frontal collision with a foreign object, the forward impact region 152 of the pivotal member would receive the impact first. In the illustrated embodiment, the pivotal member 146 has a generally L-shaped form in plan view. However, it is to be understood that any shape may be employed which provides for a forward impact region which is forwardly displaced with respect to the pivot point of the pivotal member. For example, the pivotal member 146 may be triangular shaped in plan view. The pivotal member 146 is illustrated as comprising a pair of L-shaped members joined by a bridging member 154, with the bridging member corresponding to the forward impact region 152. The skilled person will recognise, nevertheless, that the pivotal member may instead be solid or may be constituted by a single generally two dimensional pivotal member.

The illustrated L-shaped pivotal member 146 has a first arm 156 and a second arm 158. The first arm has a first end 160 which accommodates the pivot point 150 and a second end 162. The second arm has a free first end 164 and a second end 166 which co-operates with the second end 162 of the first arm 156 to constitute the forward impact region 152. The expression "co-operates" is hereby intended to encompass all forms of co-operation between the two arms. Such co-operation may be due to the fact that the L-shaped pivotal member is made in one piece such that one arm is a continuation of the other, or that the L-shaped pivotal member is fabricated from a plurality of parts such that the two arms are joined together by a suitable joint. In the illustrated embodiment, the first arm 156 is generally straight and the second arm 158 is curved. However, it is to be understood that the two arms may have any shape which will permit the arrangement to function in the manner to be described below.

It will be apparent that if the pivotal member 146 is subjected to an impact force, it will tend to rotate about the pivot point 150 such that the second arm 158 follows a first, radial, direction indicated by arrow B.

The second arm 158 has a first surface 168 directed radially away from the pivot point 150. Towards the free first end 164 of the second arm 158, a recess 170 is provided in the first surface 168. On the side of the recess towards the free first end 164, the second arm is provided with a projecting portion 172 terminating at a region which is at a maximum distance from the pivot point 150. This implies that the recess 170 is delimited by a longer surface 174 towards the free first end 164 of the second arm 158 and a shorter surface constituting an abutment surface 176 towards the second end 166 of the arm (see FIG. 10A). The recess 170 is angled with respect to the second arm such that the abutment surface 176 delimits an undercut in the arm. The dimensions of the recess 170 are selected such that the recess may accommodate the second means 144, as described in detail below.

The second means 144 of the impact energy transmitting arrangement 140 is constituted by an abutment member 178. As is schematically depicted, the abutment member 178 is biased by suitable spring means 180 towards the first surface 168 of the second arm. In other words, the abutment member is urged to accelerate towards the pivotal member 146 at a predetermined rate. In the non-influenced condition of the arrangement, the spring means 180 ensures that the abutment member 178 abuts the first surface 168 where it may be accommodated in a resting hollow 182 in the projecting portion 172 of the second arm 158. The abutment member 178 is illustrated as an elongate pin, though it is to be understood that any suitable shape of member may employed.

The third embodiment of the impact energy transmitting arrangement of the present invention is designed to be operable in the following manner.

Figure 10A:
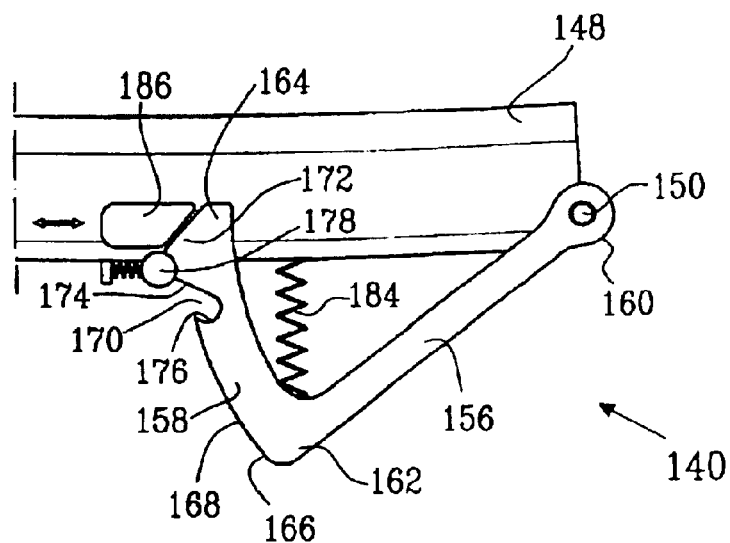
FIG. 10A is a schematic plan corresponding to FIG. 9 with the arrangement in its non-influenced condition.

The arrangement 140 is illustrated in FIG. 10A in its non-influenced condition, i.e. before impact between the vehicle upon which it is mounted and a foreign body, with the abutment member 178 being accommodated in the resting hollow 182 in the second arm 158 of the pivotal member 146. If the vehicle to which the arrangement 140 is mounted is involved in a low speed collision with a foreign body, for example the velocity of the vehicle is below 30 km/h, preferably below 20 km/h and is most preferably about 15 km/h, the arrangement will be caused to adopt the condition illustrated in FIG. 10B. Thus, upon impact, the pivotal member 146 is caused to accelerate about the pivot point 150. Due to the relatively low quantity of energy which arises during such a low speed impact, the rate of acceleration of the pivotal member will be such that the spring 180 maintains the abutment member 178 in contact with the first surface 168 of the second arm 158 of the pivotal member 146. Accordingly, the abutment member 178 slides over the longer surface 174 of the recess 170 until the abutment member is caused to abut against the abutment surface 176 of the recess. In this condition, further displacement of the pivotal member 146 in the first direction B is prevented and the arrangement presents a first resistance-to-displacement value.

Figure 10B:
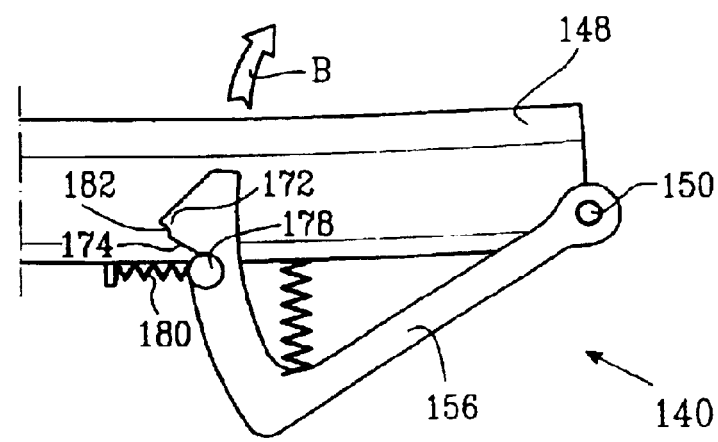
FIG. 10B is a schematic plan view corresponding to FIG. 10A, though with the arrangement in a condition after a typical low speed impact.
Figure 10C:
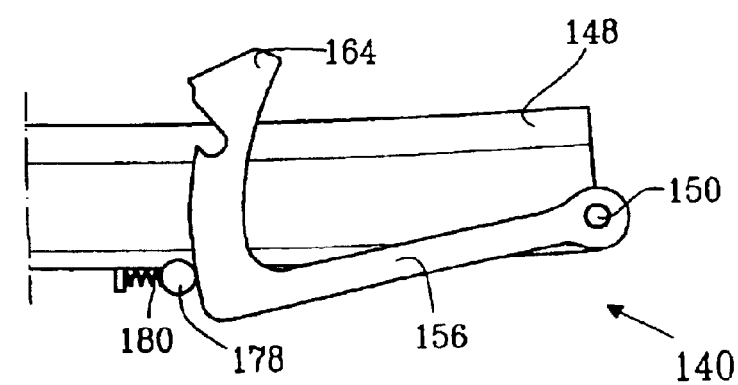
FIG. 10C is a schematic plan view corresponding to FIG. 10A, though with the arrangement in a condition after a typical impact with a pedestrian.

If the vehicle to which the arrangement 140 is mounted is involved in a somewhat higher speed collision with a foreign body, such as a pedestrian, for example the velocity of the vehicle is up to about 60 km/h, the arrangement will be caused to adopt the condition illustrated in FIG. 10C. Again, upon impact, the pivotal member 146 is caused to accelerate about the pivot point 150. Due to the higher speed of impact compared with the FIG. 10B scenario, the rate of acceleration of the pivotal member will also be higher. By appropriate selection of i.a. the biasing force applied to the abutment member 178 by the spring 180, the abutment member 178 will be caused to accelerate at a predetermined rate towards the second arm 158 of the pivotal member 146 such that before the abutment member has travelled a distance corresponding to the difference between the radial extremity of the longer surface 174 and that of the shorter surface constituting the abutment surface 176, the pivotal member has rotated about the pivot point 150 an angle corresponding to a distance greater than the radial extension of the recess 170 of the pivotal member. This implies that the recess 170 will travel past the abutment member without the abutment member having made contact with the abutment surface 176 of the recess. As such, continued displacement of the pivotal member 146 will not be hindered by the abutment member 178. In this condition, the arrangement presents a second resistance-to-displacement value which is considerably lower than the first resistance-to-displacement value attained in the FIG. 10B condition.

In a preferred embodiment of the invention, and as is schematically illustrated in FIGS. 10A and 10B, the arrangement 140 may be provided with return means 184 acting for example between the structural component 148 and the pivotal member 146 to return the arrangement to its non-influenced condition corresponding to FIG. 10A. The return means 184 may be constituted by a spring or may comprise hydraulic or pneumatic means. In a non-illustrated embodiment, the return means may be a spiral spring acting on the pivotal member about the pivot point 150.

In order that vehicle deformation zones shall function adequately during high speed collisions, an arrangement which is stiffer than that for optimal pedestrian injury reduction is required. Thus, in accordance with an preferred embodiment, the first means and second means are operable such that, as a result of an impact between the vehicle and a foreign body for which the energy to be transmitted is above a second predetermined value, the arrangement is stiffer than it would be as a result of an impact for which the energy to be transmitted is below the second predetermined value. The second predetermined value may correspond to a velocity above 40 km/h, preferably above 50 km/h and is most preferably about 60 km/h. This may be attained in a similar manner to the first embodiment by providing the arrangement 140 with actuable retarding means 186 for retarding the displacement of the pivotal member 146. In FIG. 10A the actuable retarding means 186 is schematically illustrated as a blocking element arranged to be displaced in a radial direction towards the projecting portion 172 of the first free end 164 of the second arm 158 of the pivotal member 146. Upon impact with a foreign body at a velocity above a predetermined value, the actuable retarding means 186 is actuated, for example by a speed-dependent sensor, to displace the blocking element into the path of the second arm 158, thereby retarding the pivotal member 146. Thus, the pivotal member is caused to accelerate past the abutment member 178 at a rate such that the abutment member is caused to abut against the abutment surface 176 in a manner similar to that explained above with respect to FIG. 10B.

Figure 6:
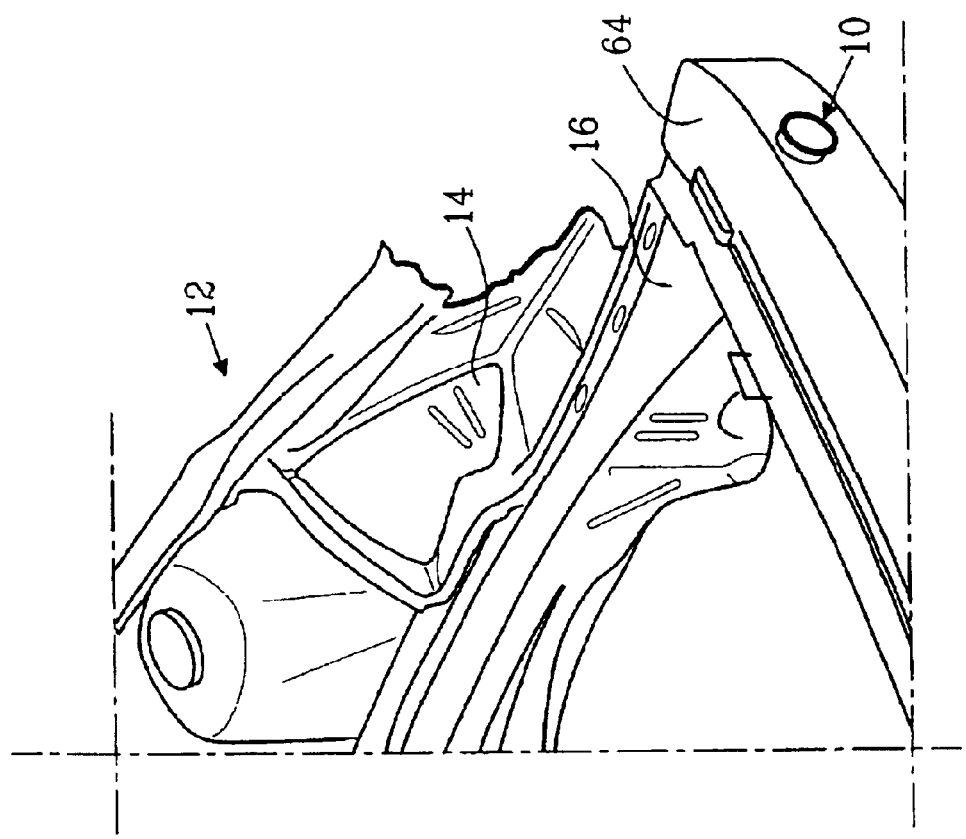
FIG. 6 is a schematic perspective view corresponding to FIG. 5, though illustrating a further embodiment.

In order to further reduce risk of pedestrian injury, the arrangements 10, 70, 140 of the present invention may be used together with a pedestrian impact energy absorber 64 as illustrated in FIG. 6. The pedestrian impact energy absorber 64 is a relatively soft component arranged transversely across the front of the vehicle 12. The absorber 64 may be covered by a (not shown) substantially rigid panel carried by the first means 18 of the impact energy transmitting arrangement 10, 70, 140 of the present invention. If a pedestrian is struck by the vehicle when the vehicle is travelling at a velocity corresponding to e.g. the FIG. 4C scenario, the impact energy will be transmitted by the substantially rigid panel to the arrangement, thereby causing the elongate member 28 to adopt the position shown in FIG. 4C. This implies that the substantially rigid panel will strike the pedestrian impact energy absorber 64, thereby effecting gentle absorption of the impact energy.

Although the arrangement according to the invention has been termed an impact energy transmitting arrangement, it is to be understood that the use of this term does not exclude the arrangement from absorbing some energy which arises during impact between the vehicle and a foreign body.

The invention has been described above and illustrated in the drawings by way of example only and the skilled person will recognise that various modifications may be made without departing from the scope of the invention as defined by the appended claims.

What is claimed is:

1. An impact energy transmitting arrangement (10; 70; 140) for transmitting energy, which arises during impact between a vehicle (12) on which said arrangement is mounted and a foreign body, to a vehicle structure (14), said arrangement (10; 70; 140) comprising first means (18; 72; 142) displaceable in a first direction (A; B), and second means (20; 74; 144) adapted for co-operation with said first means, said first and second means being operable such that the arrangement, below a first predetermined value of a parameter representative of the energy to be transmitted, presents a first resistance-to-displacement value and, above said first predetermined value, presents a second resistance-to-displacement value, the first resistance-to-displacement value being greater than the second resistance-to-displacement value.

2. The arrangement (10; 70; 140) as claimed in claim 1, wherein said first and second means (18; 72; 142; 20; 74; 144) are further operable such that the arrangement, above a second predetermined value of a parameter representative of the energy to be transmitted, said second predetermined value being higher than said first predetermined value, presents a third resistance-to-displacement value, the third resistance-to-displacement value being greater than the second resistance-to-displacement value.

3. The arrangement (10; 70; 140) as claimed in claim 1 or claim 2, wherein said energy to be transmitted which arises during impact effects acceleration of said first means (18; 72; 142).

4. The arrangement (10; 70) as claimed in any one of the preceding claims, wherein said first direction (A) in which said first means (18; 72) is displaceable is rectilinear.

5. The arrangement (10; 70) as claimed in any one of the preceding claims, wherein said first means (18; 72) is an elongate member (28; 78) having a longitudinal extension in said first direction (A).

6. The arrangement (10) as claimed in any one of the preceding claims, wherein said second means (20) is biased towards said elongate member (28) such that, during displacement of said elongate member (18) in said first direction, said second means (20) is urged to accelerate towards said elongate member (18) in a second direction substantially perpendicular to said first direction at a predetermined rate.

7. The arrangement (10) as claimed in claim 6, wherein said elongate member (28) has a transverse extension in said second direction, said elongate member (28) having a first region (32) having a first transverse dimension (34) in said second direction, a second region (36) having a second transverse dimension (38) in said second direction less than said first transverse dimension (34), and a third region (40) located between said first and second regions (32; 36), said third region (40) having a minimum third transverse dimension (42) in said second direction which is less than said second transverse dimension (38).

8. The arrangement (10) as claimed in claim 7, wherein said third region (40) abuts said second region (36) at a location at which said third region (40) has said minimum third transverse dimension (42) such that an abutment shoulder (44) is formed.

9. The arrangement (10) as claimed in claim 8, wherein said third region (40) abuts said first region (32) at a location (46) at which said third region (40) has a maximum third transverse dimension in said second direction having a value substantially equal to said first transverse dimension (34) of said first region (32), said third region (40) having a surface (48) which tapers from said maximum to said minimum third transverse dimension (42) along a first distance in said first direction.

10. The arrangement (10) as claimed in claim 9, wherein said second means (20) comprises at least one abutment member (50) having a first end (52) which, when said arrangement (10) is in a non-influenced condition, abuts against said first region (32) of said elongate member (28).

11. The arrangement (10) as claimed in claim 10, wherein during impact in which energy arises having a value below said first predetermined value of a parameter representative of the energy to be transmitted, said elongate member (28) is caused to accelerate past said first end (52) of said at least one abutment member (50) at a rate such that said at least one abutment member (50) is caused to abut against said abutment shoulder (44).

12. The arrangement (10) as claimed in claim 10, wherein during impact in which energy arises having a value above said first predetermined value of a parameter representative of the energy to be transmitted, said elongate member (28) is caused to accelerate past said first end (52) of said at least one abutment member (50) at a rate such that said first end (52) of said at least one abutment member (50) makes no contact with said third region (40) of said elongate member (28) and is caused to abut against said second region (36) of said elongate member (28).

13. The arrangement (10) as claimed in claim 10, wherein said arrangement (10) is provided with actuable retarding means (62) acting on said elongate member (28) such that during impact in which energy arises having a value above said second predetermined value of a parameter representative of the energy to be transmitted, said actuable retarding means (62) is actuated so that said elongate member (28) is caused to accelerate past said first end (52) of said at least one abutment member (50) at a rate such that said at least one abutment member (50) is caused to abut against said abutment shoulder (44).

14. The arrangement (10) as claimed in any one of claims 7 to 13, wherein said arrangement (10) is provided with a housing (22) comprising a first guide portion (24) extending in said first direction, said first guide portion (24) being adapted to guide said first region (32) of said elongate member (28), and a second guide portion (26) for guiding said second means (20), said housing (22) defining a self-contained unit.

15. The arrangement (70) as claimed in any one of claims 1 to 5, wherein said second means (74) is carried by said elongate member (78).

16. The arrangement (70) as claimed in claim 15, wherein said second means is constituted by at least one pivotal abutment member (100) having a first abutment end (104) and a second abutment end (106).

17. The arrangement (70) as claimed in claim 16, wherein said arrangement further comprises a housing (76) having an inner mantle surface (107) delimiting a through hole through which said elongate member (78) is arranged to pass, said second abutment end (106) being biased towards said inner mantle surface (107) of said housing.

18. The arrangement (70) as claimed in claim 17, wherein said housing (70) is provided with a first abutment surface (118, 122) for co-operation with said first abutment end (104) of said pivotal abutment member (100) to provide said third resistance-to-displacement value, and a second abutment surface (124) for co-operation with said second abutment end (104) of said pivotal abutment member (100) to provide said first resistance-to-displacement value.

19. The arrangement (70) as claimed in claim 18, wherein said first abutment surface (118) is formed by a portion of a first recess (120) in said inner mantle surface (107) and said second abutment surface (124) is formed by a portion of a second recess (126) in said inner mantle surface.

20. The arrangement (70) as claimed in claim 19, wherein during impact in which energy arises having a value above said first predetermined value of a parameter representative of the energy to be transmitted, said elongate member (78) is caused to accelerate such that said second abutment end (106) of the pivotal abutment member (100) will travel past said second abutment surface (124) of said second recess (126) without said second abutment end (106) making contact with the inner mantle surface of said second recess.

21. The arrangement (140) as claimed in any one of claims 1 to 3, wherein said first direction (B) in which said first means (142) is displaceable is a direction of rotation.

22. The arrangement (140) as claimed in claim 21, wherein said first means (142) is a pivotal member (146) arranged to be pivotally mounted to said vehicle structure at a pivot point (150), said pivotal member (146) presenting a first surface (168) directed radially away from said pivot point (150).

23. The arrangement (140) as claimed in claim 22, wherein said second means (144) is constituted by an abutment member (178) biased towards said first surface (168) of said pivotal member (146).

24. The arrangement (140) as claimed in claim 23, wherein said first surface (168) of said pivotal member (146) is provided with a recess (170) having an abutment surface (176), said recess being arranged to accommodate said abutment member (178) to provide said first resistance-to-displacement value.

25. The arrangement (140) as claimed in claim 24, wherein during impact in which energy arises having a value above said first predetermined value of a parameter representative of the energy to be transmitted, said pivotal member (146) is caused to accelerate such that said recess (170) of the pivotal member (146) will travel past said abutment member (178) without said abutment member making contact with said abutment surface (176) of said recess (170).

26. The arrangement (10; 70; 140) as claimed in any one of the preceding claims, wherein the velocity of the vehicle corresponding to said first predetermined value of a parameter representative of the energy to be transmitted is below 30 km/h, preferably below 20 km/h and is most preferably about 15 km/h.

27. The arrangement (10; 70; 140) as claimed in any one of claims 2 to 26, wherein the velocity of the vehicle corresponding to said second predetermined value of a parameter representative of the energy to be transmitted is above 40 km/h, preferably above 50 km/h and is most preferably about 60 km/h.

28. The arrangement (10; 70; 140) as claimed in claim 11 or 12, wherein said arrangement is provided with return means (60; 136; 184) acting on said first means (18; 72; 142) to return said arrangement to said non-influenced condition.

29. A method of reducing risk of pedestrian injury in a collision between a vehicle (12) and a pedestrian, said vehicle being provided in an impact energy transmitting arrangement (10; 70; 140) for transmitting energy, which arises during impact between said vehicle and a foreign body, to the vehicle structure (14), the method comprising the steps of:

operating said arrangement such that, below a first predetermined value of a parameter representative of the energy to be transmitted, said arrangement presents a first resistance-to-displacement value and, operating said arrangement such that, above said first predetermined value, said arrangement presents a second resistance-to-displacement value, the first resistance-to-displacement value being greater than the second resistance-to-displacement value.

* * * * *